United States Patent
Savir

(10) Patent No.: US 11,157,347 B2
(45) Date of Patent: Oct. 26, 2021

(54) DETECTION OF RESOURCE BOTTLENECKS IN USER DEVICES USING ARTIFICIAL INTELLIGENCE AND CAUSAL GRAPHS

(71) Applicant: EMC IP Holding Company LLC, Hopkinton, MA (US)

(72) Inventor: Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 31 days.

(21) Appl. No.: 16/700,428

(22) Filed: Dec. 2, 2019

(65) Prior Publication Data

US 2021/0165704 A1    Jun. 3, 2021

(51) Int. Cl.
G06F 11/00    (2006.01)
G06F 11/07    (2006.01)
G06F 11/34    (2006.01)

(52) U.S. Cl.
CPC ........ G06F 11/079 (2013.01); G06F 11/0721 (2013.01); G06F 11/3409 (2013.01)

(58) Field of Classification Search
CPC ............. G06F 11/0721; G06F 11/0754; G06F 11/076; G06F 11/079; G06F 11/3409; G06F 11/3428; G06F 11/3447; G06F 11/3452
See application file for complete search history.

(56) References Cited

U.S. PATENT DOCUMENTS

| | | | | |
|---|---|---|---|---|
| 7,043,661 B2* | 5/2006 | Valadarsky | ......... | H04L 41/0604 379/15.05 |
| 8,051,330 B2* | 11/2011 | Cinato | ..................... | H04L 43/00 714/26 |
| 8,645,019 B2* | 2/2014 | Singh | ................. | G05B 23/0278 701/30.2 |
| 9,021,077 B2* | 4/2015 | Nagai | ................. | G06F 11/0709 709/223 |
| 10,205,735 B2* | 2/2019 | Apostolopoulos | .......................... | G06F 16/9024 |
| 10,289,471 B2* | 5/2019 | Cheng | ................. | G06F 11/0709 |

(Continued)

OTHER PUBLICATIONS

U.S. Pat. No. 10,474,523, entitled "Automated Agent for the Causal Mapping of Complex Environments," filed Nov. 12, 2019.

(Continued)

*Primary Examiner* — Elmira Mehrmanesh
(74) *Attorney, Agent, or Firm* — Ryan, Mason & Lewis, LLP

(57) ABSTRACT

Techniques are provided for detection of resource bottlenecks in computing devices. A particular resource bottleneck can be identified as a cause of a current device issue based on a dynamic evaluation, by an anomaly detection module, of performance metrics of a computing device. Once a particular resource bottleneck is identified as anomalous, one or more corresponding adjustments to configuration settings for the computing device can be identified to mitigate the current device issue using a causal graph that represents the dependencies among (i) various issue types for a computing device, (ii) performance metrics of the computing device to evaluate for each issue type, and (iii) one or more resources that may be a cause of a given issue type. The corresponding adjustments to the computing device can be automatically identified based on the resource determined to be the cause of the given device issue type.

20 Claims, 6 Drawing Sheets

(56) References Cited

U.S. PATENT DOCUMENTS

| | | | | |
|---|---|---|---|---|
| 10,291,463 | B2* | 5/2019 | Sykes | H04L 41/064 |
| 10,402,289 | B2* | 9/2019 | Cheng | G06N 5/048 |
| 10,454,753 | B2* | 10/2019 | Sasturkar | G06F 11/3409 |
| 10,474,523 | B1* | 11/2019 | Taig | G06F 11/263 |
| 10,496,468 | B2* | 12/2019 | Gefen | G06F 11/0751 |
| 10,860,405 | B1* | 12/2020 | Zonneveld | G06F 11/3495 |
| 2010/0161307 | A1* | 6/2010 | Bharadwaj | G06F 11/3696 703/21 |
| 2013/0046721 | A1* | 2/2013 | Jiang | G01W 1/10 706/47 |
| 2013/0110761 | A1* | 5/2013 | Viswanathan | G06F 16/24578 706/52 |
| 2014/0047279 | A1* | 2/2014 | Sharma | G06F 11/0751 714/39 |
| 2014/0129876 | A1* | 5/2014 | Addepalli | G06F 11/0709 714/37 |
| 2015/0033084 | A1* | 1/2015 | Sasturkar | G06F 16/24578 714/46 |
| 2015/0106324 | A1* | 4/2015 | Puri | G06F 11/079 706/52 |
| 2017/0235626 | A1* | 8/2017 | Zhang | G06F 11/0775 714/26 |
| 2018/0034685 | A1* | 2/2018 | Naous | H04L 41/22 |
| 2018/0181750 | A1* | 6/2018 | Lamothe-Brassard | G06F 21/554 |

OTHER PUBLICATIONS

U.S. Appl. No. 16/260,917, entitled "Run-Time Determination of Application Performance with Low Overhead Impact on System Performance," filed Jan. 29, 2019.

"Dell Precision Optimizer" downloaded from https://www.dell.com/en-us/work/shop/dell-precision-optimizer/apd/528-bcje/software on Nov. 25, 2019.

"Dell Precision Optimizer—information, download and FAQ", downloaded from https://www.dell.com/support/article/us/en/04/sln309043/dell-precision-optimizer-information-download-and-faq?lang=en on Nov. 26, 2019.

\* cited by examiner

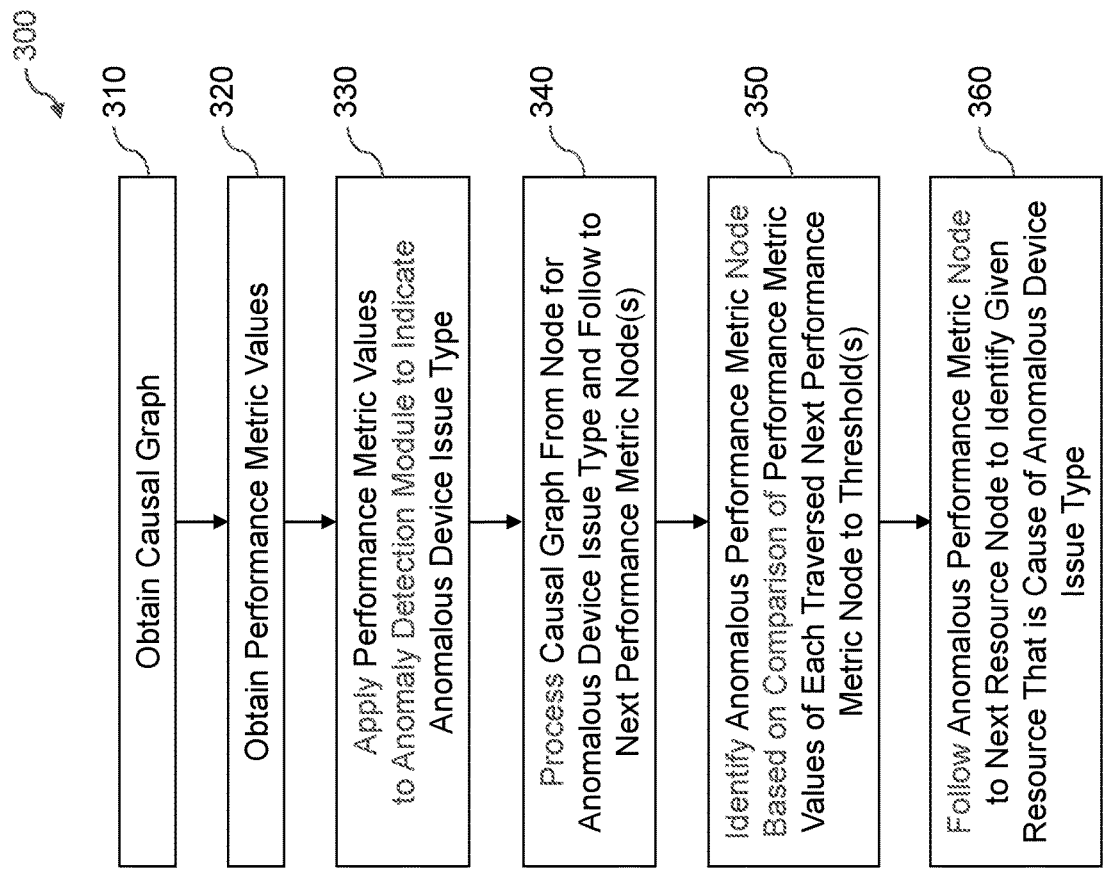

1. root_cause_score (Sink) ← 1;
2. root_cause_score (For All Nodes Except Sink) ← 0;
   Add Sink to cnode_queue;
3. If cnode_queue is Empty Goto Step 5, else:
   cnode ← cnode_queue.pop (FIFO Style);
4. Go Up One Level in Hierarchy - For Each Node (referred to herein as a *pnode*) That Has Outgoing Arcs to cnode, Check for Existence of Anomalies in Time Series Data Representing Their Behavior. If Anomaly Was Found in a Given Timeframe (e.g., 1 Hour) From Anomaly in Question:
   a. root_cause_score(pnode) ← root_cause_score (pnode) + root_cause_score (cnode)*anomaly_weight;
      Add pnode to cnode_queue;
5. Goto Step 2;
6. Remove All Nodes From Casual Graph with root_cause_score Equal to Zero;
7. Source Nodes (Nodes With no Incoming Edges) in New Causal Graph are Potential Root Causes; and
8. Generate Prioritized List from Source Nodes Using Their Scores.

FIG. 4

DETECTION OF RESOURCE BOTTLENECKS IN USER DEVICES USING ARTIFICIAL INTELLIGENCE AND CAUSAL GRAPHS

FIELD

The field relates generally to techniques for evaluating performance of a computing device.

BACKGROUND

Existing tools for improving the performance of computing devices and/or the software applications running on a given computing device are typically based on predefined rules that map each software application, for example, to a proper configuration. In addition, the supported software applications are limited (e.g., only supporting the software applications that a development team has previously evaluated in a laboratory setting).

A need remains for dynamic techniques for improving the performance of computing devices.

SUMMARY

In one embodiment, a method comprises obtaining a causal graph comprising connections between: (i) a plurality of performance issue types for a computing device, (ii) one or more performance metrics of the computing device to evaluate for each performance issue type, and (iii) one or more resources that may be a cause of a given performance issue type; obtaining values of at least some of the one or more performance metrics of the computing device; applying the obtained values of the performance metrics to an anomaly detection module that generates an anomaly score for each of the corresponding performance metrics, wherein the anomaly score for each of the corresponding performance metrics is analyzed to identify an anomaly indicating a current performance issue type; processing the causal graph starting with a first node corresponding to the current performance issue type and traversing to one or more next performance metric nodes from the first node, wherein each next performance metric node identifies one of the values of the performance metrics of the computing device to evaluate; identifying an anomalous performance metric node in the causal graph having an anomaly based at least in part on a comparison of the value of the performance metric associated with each traversed next performance metric node to one or more corresponding predefined criteria; and following the anomalous performance metric node to a next resource node to identify a given resource that is a cause of the current performance issue type.

In one or more embodiments, the next resource node further comprises one or more corresponding adjustments to one or more configuration settings for the computing device to mitigate the current performance issue type.

In some embodiments, the causal graph comprises a directed graph having a plurality of nodes each corresponding to a different variable, wherein an arc is present between a given first node and a given second node when the variable of the given second node responds to changes in the variable of the given first node.

Other illustrative embodiments include, without limitation, apparatus, systems, methods and computer program products comprising processor-readable storage media.

BRIEF DESCRIPTION OF THE DRAWINGS

FIG. 3 is a flow chart illustrating an exemplary implementation of a performance assessment/adjustment process, according to one embodiment;

FIG. 4 illustrates exemplary pseudo code for a root cause identification process, according to one or more embodiments of the disclosure;

DETAILED DESCRIPTION

Figure 1:
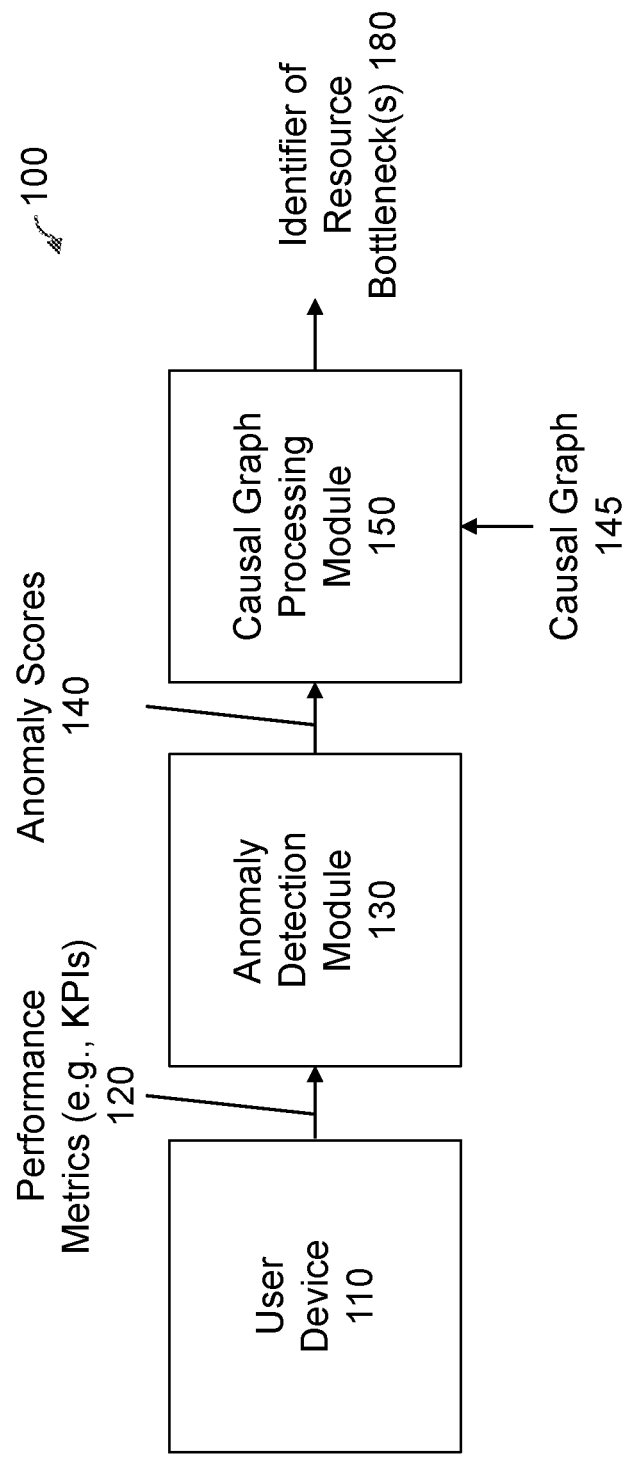
FIG. 1 illustrates an exemplary performance assessment environment, according to some embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detection of resource bottlenecks in user devices using artificial intelligence and causal graphs.

In one or more embodiments, a particular resource bottleneck is identified as a cause of a current device issue based on a dynamic evaluation of performance metrics of a computing device. In addition, once the particular resource bottleneck has been identified using the disclosed techniques, one or more corresponding adjustments to configuration settings for the computing device can be identified to mitigate the current device issue. In this manner, the corresponding adjustments to the computing device that will improve the performance of the computing device are automatically identified based on the detected resource bottleneck.

Consider a streaming process that runs on a user device and has experienced one or more performance issues. One symptom often has multiple possible causes. Typically, the root cause for the performance issues can be related to network issues (e.g., if the stream is a remote stream); memory issues (e.g., if playing streamed content from a hard drive (e.g., One Drive), when disk is loaded; storage issues (if playing streamed content from a local source); central processing unit (CPU) issues; and/or graphics processing unit (GPU) issues (especially when the resolution is high).

One or more aspects of the disclosure recognize that each of the above-identified possible issues that contributed to the performance issues for the example streaming process has a different set of possible adjustments to configuration settings for the computing device that can mitigate the current performance device issue. The challenge, however, is often to detect the relevant component and/or resource that can have a better configuration.

One or more embodiments of the present disclosure provide techniques for automating a root cause analysis for a user device. A graphical representation (e.g., a causal graph) is employed representing the dependencies among device issue types for a computing device, performance metrics (e.g., key performance indicators (KPIs)) of the computing device to evaluate for each device issue type, and one or more resources that may be a cause of a given device issue type. The graphical representation can be obtained using domain experts and/or by using semi-supervised techniques, such as those described in U.S. Pat. No. 10,474,523, entitled "Automated Agent for the Causal Mapping of Complex Environments," incorporated by reference herein in its entirety.

In some embodiments, values of performance metrics of the computing device are applied to an anomaly detection module that generates an anomaly score for each of the performance metrics. The anomaly scores can be analyzed to identify an anomaly indicating a current device issue type. The causal graph is then processed to search for a cause of the identified anomaly. Generally, the graph is traversed in a reverse order from the node in which an outlier was detected and the components of the causal graph are analyzed along the path. The root cause, in at least some embodiments, is a "highest" node in the hierarchy demonstrating anomalous or otherwise unusual behavior.

Generally, causal graphs are graphical models used to encode causal assumptions, for example, about a data generating process. Causal graphs are used in several fields, such as computer science, epidemiology and social sciences. Each variable in the model typically has a corresponding node and an arrow (e.g., an arc in graphical terminology) is drawn from a first variable v1 to a second variable v2, if v2 is presumed to respond to changes that occur in v1 when all other variables are being held constant. Causal graphs are also directed acyclic graphs (DAGs; e.g., graphs with no cycles). In a DAG, nodes with only outgoing arcs are called sources while nodes with only ingoing arcs are called sinks.

When an automated performance assessment tool attempts to improve performance for a given device, the performance assessment tool will change one or more configuration settings for the given device (often referred to a different "knobs") in order to improve performance for a given workload. See, for example, U.S. patent application Ser. No. 16/260,917, filed Jan. 29, 2019, entitled "Run-Time Determination of Application Performance with Low Overhead Impact on System Performance," incorporated by reference herein in its entirety.

One challenge is identifying the particular configuration settings to adjust for the given device. There are often a large number of configuration settings that can be adjusted to improve the performance of the device. Thus, evaluating all of the possible adjustments and measuring the performance metrics to identify one configuration adjustment will take time (and once multiplied by all the possible combinations, will be too costly in terms of time complexity).

In addition, a user experience (as well as the user trust in the assessment tool) may be negatively affected if the performance assessment/adjustment tool takes too much time, for example, while any changes in each iteration are validated. Further, a given iteration or cycle might be wasted if the performance assessment/adjustment tool attempts to make an adjustment that is not supported by the device and/or has another limitation, such as the hardware itself.

FIG. 1 illustrates an exemplary performance assessment environment 100, according to some embodiments of the disclosure, for assessing and/or adjusting the performance of a user device 110. As shown in FIG. 1, the exemplary performance assessment environment 100 comprises a user device 110 (e.g., a mobile telephone, tablet or a laptop), one or more anomaly detection modules 130 and one or more causal graph processing modules 150. The anomaly detection module 130 and/or the causal graph processing module 150 may be located, for example, in a cloud. In some embodiments, the exemplary user device 110 collects performance information related to, for example, the user device 110 and/or one or more processes running on the user device 110, collectively referred to as performance metrics 120 (e.g., KPIs), and provides the performance metrics 120 to the anomaly detection module 130. In some embodiments, the anomaly detection module 130 generates an anomaly score 140 for each of the performance metrics 120. The anomaly score for the performance metrics 120 can then be analyzed to identify an anomaly indicating a current performance issue type.

In one or more embodiments, the anomaly detection module 130 may employ several known ways to process the performance metrics 120 to identify anomalies in time series data, such as unsupervised learning techniques that do not require labeled training data. For example, the anomaly detection module 130 may employ one or more smoothers of the time series data and/or employ forecasting methods. It has been found, for example, that forecasting methods are better suited for detecting an outlier on the edge of a time series (e.g., the newest data point). A competition can be employed between different forecasting models, choosing the forecasting model that performs the best on a test data set (e.g., the forecasting model that has a minimal or substantially minimal error). The selected model is used for forecasting and the difference between the actual value and the predicted value is calculated and evaluated. If the residual value is significantly larger when compared to the residual population, an anomaly is declared. This method will detect unexpected changes in trend or seasonality (for example, for a given performance metric 120, such as CPU utilization, the signal may vary across time; thus, an anomaly for a given performance metric 120 may comprise, for example, a trend change anomaly, a high stress anomaly, a surge anomaly, or a low value anomaly for the given performance metric 120). In some embodiments, weights are assigned for the various potential anomalies, for example, based on the significance of the residual.

The user devices 110 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 110 and anomaly detection module 130 of FIG. 1, for example, can be coupled using a network (not shown), where the network is assumed to represent a sub-network or other related portion of a larger computer network.

Figure 2:
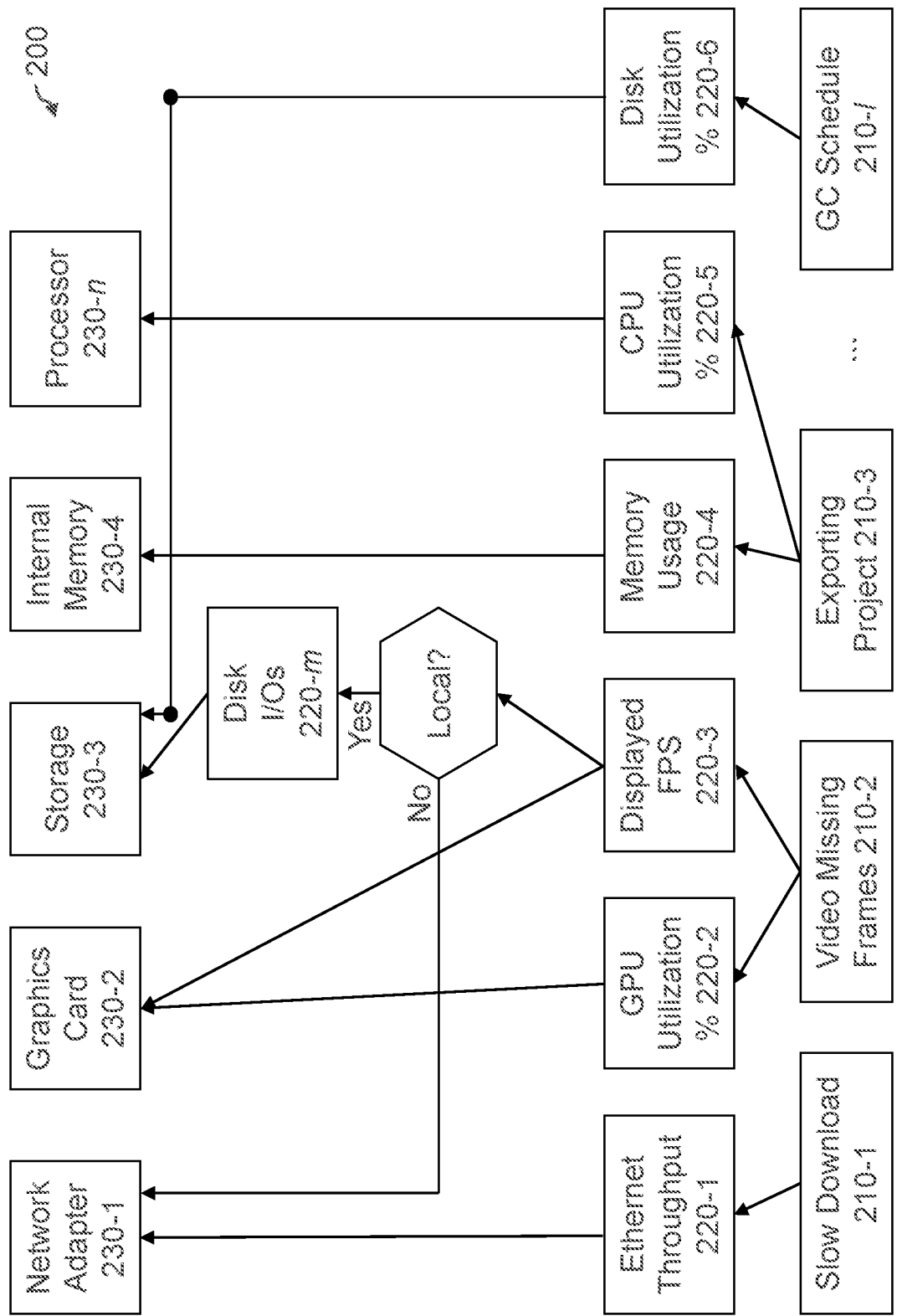
FIG. 2 illustrates a causal graph according to one or more embodiments of the disclosure.

The anomaly scores can be analyzed, for example, by the anomaly detection module 130 or the causal graph processing module 150, to identify an anomaly indicating a current device issue type. A causal graph 145, as discussed further below in conjunction with FIG. 2, is then processed by the causal graph processing module 150 to search for a cause of the identified anomaly. Generally, the causal graph 145 is traversed in a reverse order from the node in which an outlier was detected and the components of the causal graph 145 are analyzed along the path, as discussed further below. The root cause, in at least some embodiments, is a "highest" node in the hierarchy demonstrating anomalous or otherwise unusual behavior.

As shown in the example of FIG. 1, the causal graph processing module 150 identifies one or more resource bottlenecks 180 (e.g., using resource bottleneck identifiers)

as a cause of a current device issue. In some embodiments, the resource bottleneck identifier 180 may comprise a prioritized list of possible causes to an observed performance degradation. Thus, a performance adjustment can focus on a subset of the possible configuration settings for the given user device 110 that affects the root cause.

FIG. 2 illustrates a causal graph 200 according to one or more embodiments of the disclosure. Generally, a causal graph 200 may be a diagram representing a system of connections (e.g., causal relations) between two or more variables. Specifically, a causal graph 200 may be presented as a directed graph, or as a set of nodes (or vertices) that may or may not be connected to one another through edges, where each edge may be associated with a direction. It is noted that the causal graph 200 is presented in FIG. 2 to illustrate aspects of the present disclosure, and a full causal graph would typically be more complex than the exemplary causal graph 200 shown in FIG. 2.

In one embodiment of the disclosure, shown in FIG. 2, a node or vertex may represent a performance issue type node 210-1 through 210-l each corresponding to a different performance issue type for a given user device 110, a performance metric node 220-1 through 220-m each corresponding to a different performance metric (such as displayed frames per second (FPS)) to evaluate for each performance issue type, and a resource node 230-1 through 230-n each corresponding to a different resource that may be a cause of a given performance issue type.

Edges in the causal graph 200 between two nodes may represent a causal relation between the two nodes, if any. Further, the direction associated with an edge between a source node and a target node may imply that the source node may be the cause of an effect exhibited by the target node. In at least one embodiment of the disclosure, each edge in the causal graph 200 may further be associated with a value and/or color (not shown). The value and/or color may denote the strength of the casual relation between the corresponding source and target nodes (and/or a class 210, 220, 230 of the node). Further, a discrete scale may be optionally employed in some embodiments to classify each edge or to assign a color to each edge based on where the value associated with an edge normalizes or maps along the discrete scale.

In some embodiments, the disclosed techniques for detection and mitigation of resource bottlenecks in user devices using artificial intelligence and causal graphs leverage the causal graph 145 (or causal graph 200) that models the relevant system. As noted above, the structure and components of the causal graph 145 are the input for the causal graph processing module 150 that searches for a root cause to a performance issue. Thus, the components selected to be part of the causal graph 145 should represent measurable and trackable processes, for which a time series could be generated that tracks the changes of the process across time in an appropriate scale, in some embodiments. For example, log data, which are events in time, can be transformed into time series data using aggregations.

As noted above, the graphical representation of the causal graph 145 can be obtained using domain experts and/or by using semi-supervised techniques, such as those described in U.S. Pat. No. 10,474,523, entitled "Automated Agent for the Causal Mapping of Complex Environments," incorporated by reference herein in its entirety.

As discussed hereinafter, and as noted above, in some embodiments, the anomaly detection module 130 generates an anomaly score 140 for each of the performance metrics 120. The anomaly score for the performance metrics 120 can then be analyzed to identify an anomaly indicating a current performance issue type.

In addition, the causal graph 145/200 can be processed by the causal graph processing module 150 to provide a mechanism that searches for possible causes of a performance issue.

FIG. 3 is a flow chart illustrating an exemplary implementation of a performance assessment/adjustment process 300, according to one embodiment of the disclosure. As shown in FIG. 3, the exemplary performance assessment/adjustment process 300 initially obtains a causal graph 145 during step 310 comprising connections between a plurality of performance issue types for a user device 110, one or more performance metrics 120 of the user device 110 to evaluate for each performance issue type, and one or more resources that may be a cause of a given performance issue type.

During step 320, values of the performance metrics 120 of the user device 110 are obtained. For example, the values of the one or more performance metrics of the computing device may be obtained by monitoring Windows Management Instrumentation (WMI) data and graphics data.

Thereafter, the exemplary performance assessment/adjustment process 300 applies the obtained values of the performance metrics 120 during step 330 to the anomaly detection module 130 that generates the anomaly score 140 for each performance metric 120. The anomaly score 140 for each performance metric can be analyzed, for example, by the anomaly detection module 130 or the causal graph processing module 150, to identify an anomaly indicating a current performance issue type.

The causal graph 145 is processed during step 340, for example, by the causal graph processing module 150, starting with a first node corresponding to the current performance issue type. Thereafter, the causal graph 145 is traversed to one or more next performance metric nodes from the first node. As noted above, each next performance metric node identifies one of the values of the performance metrics of the computing device to evaluate.

During step 350, an anomalous performance metric node is identified in the causal graph 145 having an anomaly based at least in part on a comparison of the value of the performance metric associated with each traversed next performance metric node to one or more corresponding predefined criteria (such as satisfying corresponding thresholds).

The identified anomalous performance metric node is followed during step 360 to a next resource node to identify a given resource that is a cause of the current performance issue type.

FIG. 4 illustrates exemplary pseudo code for a root cause identification process 400, according to one embodiment of the disclosure. Generally, the chosen tracked process will usually be a sink in the causal graph 145 representing an end process of some pipeline. As shown in FIG. 4, when detecting an anomaly in a sink process, the following exemplary procedure is executed that travels the causal graph 145 starting at the sink node:

1. root_cause_score(sink)←1;
   root_cause_score(for all nodes except sink)←0;
   Add sink to cnode_queue;
2. If cnode_queue is empty goto 5, else: cnode←cnode_queue.pop (FIFO style);
3. Go up one level in the hierarchy—for each node (referred to herein as a pnode) that has outgoing arcs to cnode, check for the existence of anomalies in the time series data that represent their behavior. If an anomaly was found in a given timeframe (e.g., 1 hour) from the anomaly in question:

a. root_cause_score(pnode)←root_cause_score (pnode)+ root_cause_score (cnode)*anomaly_weight;
    Add pnode to cnode_queue;
    4. Goto Step 2;
    5. Remove from the casual graph 145 all nodes with root_cause_score equal to zero;
    6. The source nodes (e.g., nodes with no ingoing edges) in the new causal graph 145 are the potential root causes; and
    7. Generate a prioritized list from the source nodes using their scores.

Upon detection of a predefined anomaly with the user device 110, the causal graph processing module 150 can optionally initiate or execute one or more predefined remedial steps and/or mitigation steps to address the detected predefined anomalies. For example, the predefined remedial steps and/or mitigation steps to address the detected predefined anomalies may comprise the transmission of an alert or alarm to the user device 110 and/or user for important or suspicious anomalies; isolating, removing, quarantining, limiting permissions, analyzing, and deactivating one or more of the user devices 110 and/or one or more files, accounts or aspects of the user devices 110 or the user; notifying one or more third party systems (such as sending an email, or generating an alert in another system); quarantining one or more files or folders, and preventing one or more further actions from being executed associated with the user devices 110 associated with the detected anomalies.

In one or more embodiments, a performance assessment/adjustment solution is provided that employs machine learning techniques, time series analysis and causal graph processing techniques to identify a root cause of a performance issue and to optionally suggest one or more corresponding adjustments to one or more configuration settings for the user device 110 to mitigate the current performance issue type.

In some embodiments, the disclosed performance assessment/adjustment approach comprises a hybrid solution in the sense that the solution is driven by both data and domain expertise.

Among other benefits, the disclosed performance assessment/adjustment techniques improve a total customer experience, by boosting the performance of the user device 110, increase customer loyalty, and also elevate a competitive industry impact for devices of a given product provider.

In some embodiments, the disclosed performance assessment/adjustment techniques automatically identify a root cause of a performance issue and identify one or more corresponding adjustments to one or more configuration settings for the user device 110 to mitigate the current performance issue type.

One or more embodiments of the disclosure provide improved methods, apparatus and computer program products for detection and mitigation of resource bottlenecks in user devices using artificial intelligence and causal graphs. The foregoing applications and associated embodiments should be considered as illustrative only, and numerous other embodiments can be configured using the techniques disclosed herein, in a wide variety of different applications.

It should also be understood that the disclosed performance assessment/adjustment techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detection and mitigation of resource bottlenecks in user devices using artificial intelligence and causal graphs may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based performance assessment/adjustment engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based performance assessment/adjustment platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
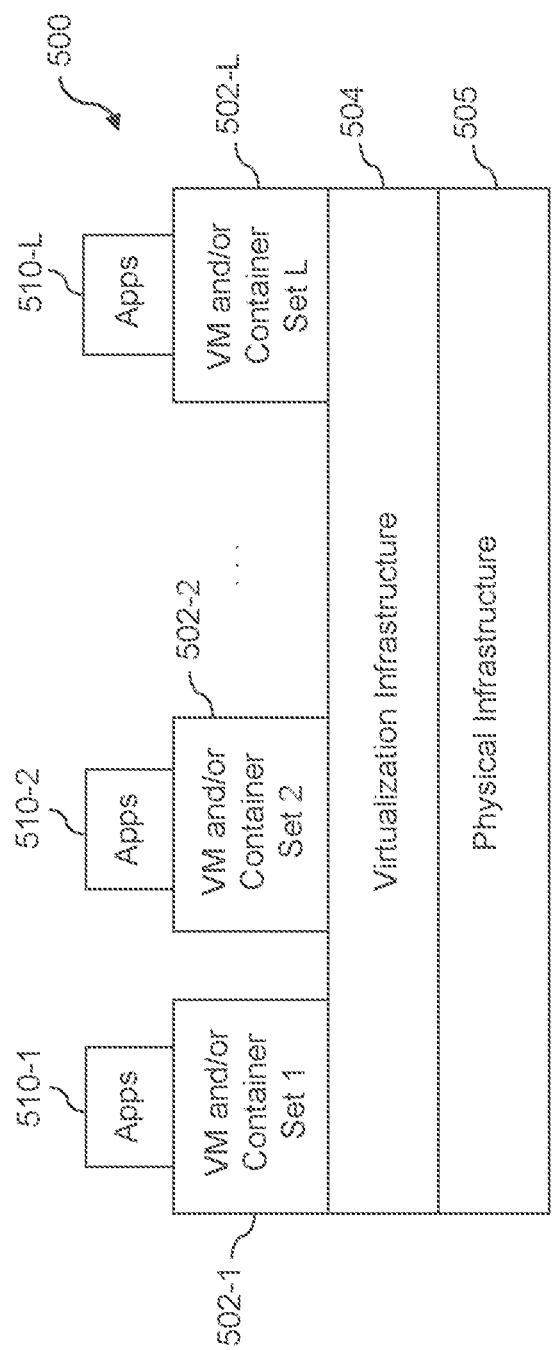
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide performance assessment/adjustment functionality of the type described above for one or more processes running on a given one of the VMs. For example, each of the VMs can implement performance assessment/adjustment control logic and associated causal graph processing techniques for providing performance assessment/adjustment functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide performance assessment/adjustment functionality of the type described above for one or more processes running on different ones of the containers. For example, a container host device supporting multiple containers of one or more container sets can implement one or more instances of performance assessment/adjustment control logic and associated causal graph processing techniques for providing performance assessment/adjustment functionality.

As is apparent from the above, one or more of the processing modules or other components of performance assessment environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
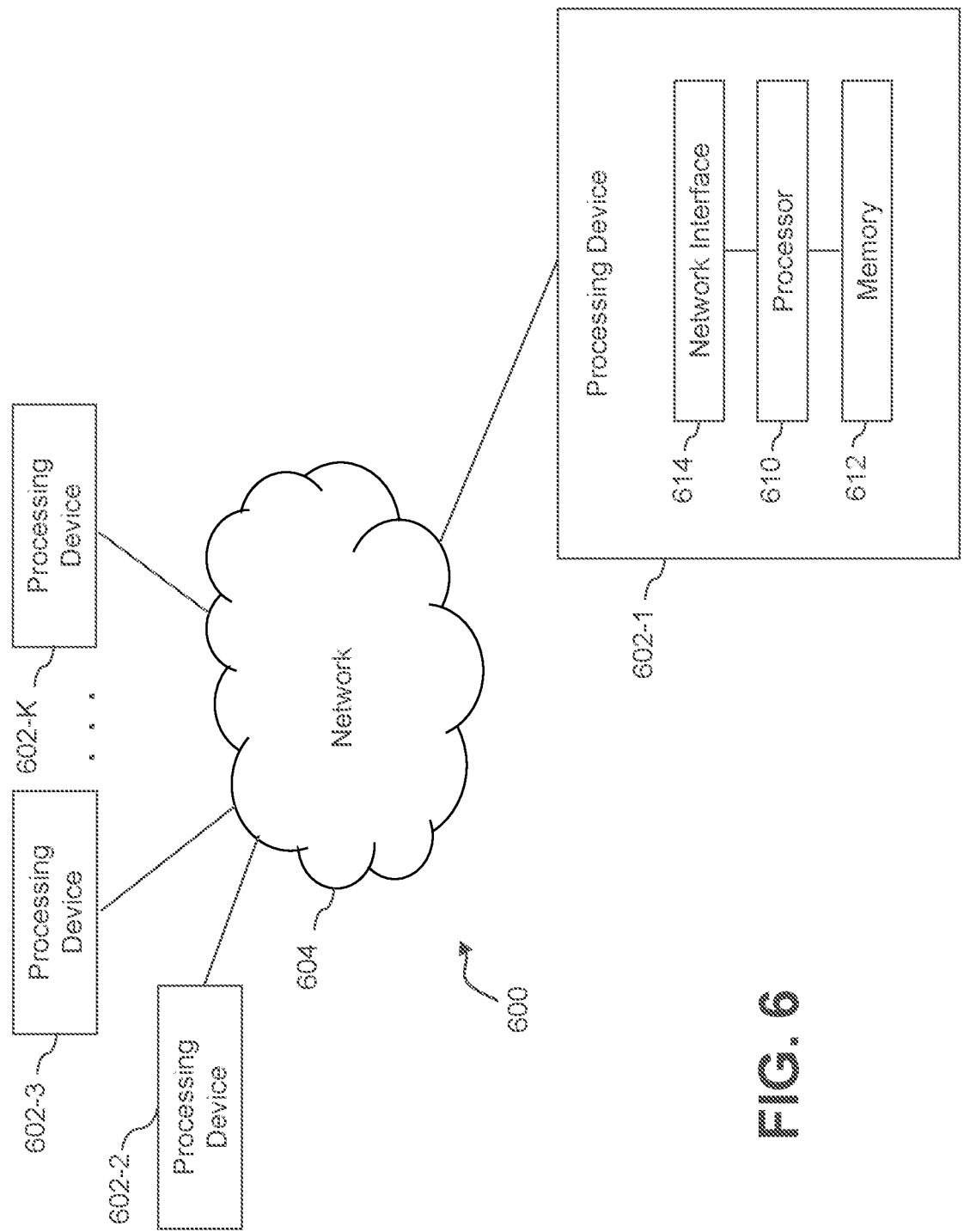
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a causal graph comprising connections between: (i) a plurality of performance issue types for a computing device in a first hierarchical level of the causal graph, (ii) one or more performance metrics of the computing device to evaluate for each performance issue type in a second hierarchical level of the causal graph, and (iii) one or more resources in a third hierarchical level of the causal graph that may be a cause of a given performance issue type;
    obtaining values of at least some of the one or more performance metrics of the computing device;
    identifying an anomaly indicating a current performance issue type by: (i) applying the obtained values of the performance metrics to an anomaly detection module that generates an anomaly score for each of the corresponding performance metrics, and (ii) analyzing the anomaly score for each of the corresponding performance metrics to identify the anomaly indicating the current performance issue type;
    in response to the identifying the anomaly indicating the current performance issue type:
    automatically processing the causal graph starting with a first node in the first hierarchical level of the causal graph corresponding to the current performance issue type and traversing to one or more next performance metric nodes, in the second hierarchical level of the causal graph, connected to the first node, wherein each next performance metric node identifies one of the values of the performance metrics of the computing device to evaluate;
    automatically identifying an anomalous performance metric node in the causal graph having an anomaly based at least in part on a comparison of the value of the performance metric associated with each traversed next performance metric node to one or more corresponding predefined criteria; and
    following the anomalous performance metric node to a next resource node of the causal graph to automatically identify a given resource that is a cause of the current performance issue type;
    wherein the method is performed by at least one processing device comprising a processor coupled to a memory.

2. The method of claim 1, wherein the one or more performance metrics comprise one or more of at least one device level performance metric and at least one process level performance metric.

3. The method of claim 1, wherein the causal graph is one or more of obtained from one or more domain experts to represent a logical approach of the one or more domain experts, and obtained using one or more semi-supervised techniques.

4. The method of claim 1, wherein the values of the one or more performance metrics of the computing device are obtained from a time series telemetry data stream for each of a plurality of key performance indicators during an execution of the computing device.

5. The method of claim 1, wherein the given resource that is a cause of the current performance issue type comprises a node in the causal graph in a substantially maximal position of the causal graph.

6. The method of claim 1, wherein the causal graph comprises a directed graph having a plurality of nodes each corresponding to a different variable, wherein an arc is present between a given first node and a given second node when the variable of the given second node responds to changes in the variable of the given first node.

7. The method of claim 1, wherein the identified anomaly comprises one or more of a trend change anomaly, a high stress anomaly, a surge anomaly, and a low value anomaly.

8. The method of claim 1, wherein the next resource node further comprises one or more corresponding adjustments to one or more configuration settings for the computing device to mitigate the current performance issue type.

9. An apparatus comprising:
    at least one processing device comprising a processor coupled to a memory;
    the at least one processing device being configured to implement the following steps:
    obtaining a causal graph comprising connections between: (i) a plurality of performance issue types for a computing device in a first hierarchical level of the causal graph, (ii) one or more performance metrics of the computing device to evaluate for each performance issue type in a second hierarchical level of the causal graph, and (iii) one or more resources in a third hierarchical level of the causal graph that may be a cause of a given performance issue type;
    obtaining values of at least some of the one or more performance metrics of the computing device;
    identifying an anomaly indicating a current performance issue type by: (i) applying the obtained values of the performance metrics to an anomaly detection module that generates an anomaly score for each of the corresponding performance metrics, and (ii) analyzing the anomaly score for each of the corresponding performance metrics is analyzed to identify the anomaly indicating the current performance issue type;

in response to the identifying the anomaly indicating the current performance issue type:

automatically processing the causal graph starting with a first node in the first hierarchical level of the causal graph corresponding to the current performance issue type and traversing to one or more next performance metric nodes, in the second hierarchical level of the causal graph, connected to the first node, wherein each next performance metric node identifies one of the values of the performance metrics of the computing device to evaluate;

automatically identifying an anomalous performance metric node in the causal graph having an anomaly based at least in part on a comparison of the value of the performance metric associated with each traversed next performance metric node to one or more corresponding predefined criteria; and following the anomalous performance metric node to a next resource node of the causal graph to automatically identify a given resource that is a cause of the current performance issue type.

10. The apparatus of claim 9, wherein the values of the one or more performance metrics of the computing device are obtained from a time series telemetry data stream for each of a plurality of key performance indicators during an execution of the computing device.

11. The apparatus of claim 9, wherein the given resource that is a cause of the current performance issue type comprises a node in the causal graph in a substantially maximal position of the causal graph.

12. The apparatus of claim 9, wherein the causal graph comprises a directed graph having a plurality of nodes each corresponding to a different variable, wherein an arc is present between a given first node and a given second node when the variable of the given second node responds to changes in the variable of the given first node.

13. The apparatus of claim 9, wherein the identified anomaly comprises one or more of a trend change anomaly, a high stress anomaly, a surge anomaly, and a low value anomaly.

14. The apparatus of claim 9, wherein the next resource node further comprises one or more corresponding adjustments to one or more configuration settings for the computing device to mitigate the current performance issue type.

15. A non-transitory processor-readable storage medium having stored therein program code of one or more software programs, wherein the program code when executed by at least one processing device causes the at least one processing device to perform the following steps:

obtaining a causal graph comprising connections between: (i) a plurality of performance issue types for a computing device in a first hierarchical level of the causal graph, (ii) one or more performance metrics of the computing device to evaluate for each performance issue type in a second hierarchical level of the causal graph, and (iii) one or more resources in a third hierarchical level of the causal graph that may be a cause of a given performance issue type;

obtaining values of at least some of the one or more performance metrics of the computing device;

identifying an anomaly indicating a current performance issue type by: (i) applying the obtained values of the performance metrics to an anomaly detection module that generates an anomaly score for each of the corresponding performance metrics, and (ii) analyzing the anomaly score for each of the corresponding performance metrics to identify the anomaly indicating the current performance issue type;

in response to the identifying the anomaly indicating the current performance issue type:

automatically processing the causal graph starting with a first node in the first hierarchical level of the causal graph corresponding to the current performance issue type and traversing to one or more next performance metric nodes, in the second hierarchical level of the causal graph, connected to the first node, wherein each next performance metric node identifies one of the values of the performance metrics of the computing device to evaluate;

automatically identifying an anomalous performance metric node in the causal graph having an anomaly based at least in part on a comparison of the value of the performance metric associated with each traversed next performance metric node to one or more corresponding predefined criteria; and following the anomalous performance metric node to a next resource node of the causal graph to automatically identify a given resource that is a cause of the current performance issue type.

16. The non-transitory processor-readable storage medium of claim 15, wherein the values of the one or more performance metrics of the computing device are obtained from a time series telemetry data stream for each of a plurality of key performance indicators during an execution of the computing device.

17. The non-transitory processor-readable storage medium of claim 15, wherein the given resource that is a cause of the current performance issue type comprises a node in the causal graph in a substantially maximal position of the causal graph.

18. The non-transitory processor-readable storage medium of claim 15, wherein the causal graph comprises a directed graph having a plurality of nodes each corresponding to a different variable, wherein an arc is present between a given first node and a given second node when the variable of the given second node responds to changes in the variable of the given first node.

19. The non-transitory processor-readable storage medium of claim 15, wherein the identified anomaly comprises one or more of a trend change anomaly, a high stress anomaly, a surge anomaly, and a low value anomaly.

20. The non-transitory processor-readable storage medium of claim 15, wherein the next resource node further comprises one or more corresponding adjustments to one or more configuration settings for the computing device to mitigate the current performance issue type.

* * * * *

UNITED STATES PATENT AND TRADEMARK OFFICE
CERTIFICATE OF CORRECTION

PATENT NO. : 11,157,347 B2  
APPLICATION NO. : 16/700428  
DATED : October 26, 2021  
INVENTOR(S) : Amihai Savir et al.

Page 1 of 1

It is certified that error appears in the above-identified patent and that said Letters Patent is hereby corrected as shown below:

In the Claims

Column 13, Line 1, in Claim 9, replace "mance metrics is analyzed to identify the anomaly" with --mance metrics to identify the anomaly--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*